Patented June 12, 1945

2,378,189

UNITED STATES PATENT OFFICE 2,378,189

MODIFIED BUTADIENE POLYMERS AND METHOD OF MAKING THE SAME

Albert M. Clifford, Stow, and William D. Wolfe, Cuyahoga Falls, Ohio, assignors to Wingfoot Corporation, Akron, Ohio, a corporation of Delaware No Drawing. Application October 18, 1940, Serial No. 361,724

2 Claims. (Cl. 260—92.5)

This invention relates to certain new copolymers and, more particularly, to polymeric compositions containing three monomeric constituents.

Heretofore, it has been known that chloro butadiene would copolymerize with other butadienes or with monomers other than the butadienes, but no attempt has been made to polymerize a halogen butadiene and a hydrocarbon butadiene in the presence of a third monomeric substance which is not a butadiene. It has now been found that the addition of a quantity of a substance such as vinylidene chloride or methyl methacrylate to a mixture of a halo butadiene, such as 2-chloro 1,3-butadiene or 2,3-dichloro 1,3 butadiene, and a hydrocarbon butadiene greatly increases the yield obtainable from the polymerization. The non-butadiene constituent enters into the reaction and adds its weight to the product but the increase in yield is more than can be accounted for by the amount of material thus added. The products obtainable usually have rubber-like characteristics and may be used where synthetic rubber is desired.

The modifying agent is a substance included within the general formula

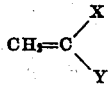

where X is selected from the group consisting of hydrogen, alkyl and halogen and Y is selected from the group consisting of COO-aliphatic and chlorine, Y being solely carboxy-aliphatic when X is other than halogen. The class includes, then, vinylidene chloride, methyl acrylate, methyl methacrylate, allyl methacrylate, ethyl acrylate, propyl acrylate, ethyl methacrylate, ethyl ethacrylate, methyl alpha chloroacrylate, methyl alpha bromoacrylate, methyl alpha butylacrylate, beta chloroethyl methacrylate, ethoxyethyl methacrylate, and other compounds coming within the general formula set forth above.

The mixture of butadienes, the polymerization of which is promoted by the addition of any of the foregoing substances, may consist of 2-chloro 1,3-butadiene+1,3-butadiene, 2,3-dichloro 1,3-butadiene+1,3-butadiene, 2-bromo 1,3-butadiene+1,3-butadiene, 2-chloro 1,3-butadiene+isoprene, 2-chloro 1,3-butadiene+2,3-dimethyl 1,3-butadiene, 2-bromo 1,3-butadiene+2,3-dimethyl 1,3-butadiene, 2,3-dichloro 1,3-butadiene+isoprene, 2,3-dichloro-butadiene+2,3-dimethyl 1,3-butadiene, 2,3-dibromo 1,3-butadiene+1,3-butadiene, and, in addition, all mixtures of butadienes in which one constituent is a butadiene containing at least one halogen substituent and the other is a hydrocarbon butadiene, for example, mixtures of any halo butadiene with any hydrocarbon butadiene mentioned above. By themselves, these butadienes give rather poor yields of products with often unsatisfactory physical properties, whereas the addition of a small amount, as low as 5%, but which may be as much as 40%, based on the total butadienes present, of one of the modifying agents mentioned above results in greatly increased yields of products which are usually of improved physical characteristics. The two butadienes may be present in varying proportions as between themselves, a useful range of proportions being from 20-80% of one, and, correspondingly, from 80 to 20% of the other.

The several components may be mixed and copolymerized in accordance with the various methods known to the art, such as by action of ultra-violet light in the presence or absence of a solvent or by emulsion polymerization in an aqueous medium containing an emulsifying agent, such as Aquarex D, (a mixture of sodium salts of the monosulfuric acid esters of lauryl and myristicyl alcohols), Gardinol AA, (sodium alkyl sulfate), Wetanol (a modified sulfated fatty acid ester), Nekal BX (sodium alkyl naphthylene sulfonate), and the like, and preferably with the aid of an oxidizing agent, such as benzoyl peroxide, sodium perborate, hydrogen peroxide, sodium persulfate, etc. These oxidizing agents may also be employed where the monomers are polymerized without the aid of an emulsion, their use increasing the rate of reaction. In the emulsion polymerization, which is the preferred method of procedure, the reaction mass is heated to a temperature usually between 25-80° C. but desirably in the neighborhood of 40-60° C. The reaction is carried on for such length of time as will yield a copolymer of the required characteristics, this result often being obtained before complete polymerization is achieved. A period of a few hours to several days may be required.

To illustrate the advantages of the invention, the following examples are given, the first showing the results obtained in the absence of the modifying agent.

Example 1

An emulsifying medium consisting of 18 cc. of 2.5% aqueous solution of alkylated hydroxydiphenyl sodium sulfonate, 0.1 grams of sodium perborate, 0.4 grams of CCl₄ and 0.1 cc. of 7.76 N- sodium hydroxide was used to disperse 13.1 grams of butadiene-1,3 and 2.3 grams 2-chloro butadiene 1,3. The emulsion was sealed in a glass bomb and was agitated at a temperature of 70° C. for a period of 7 days. Thereupon, the product was washed with alcohol and vacuum dried to give a yield of 0.8 grams or 5.2%. The product was very weak and had no known technical value.

*Example 2*

This run was conducted in precisely the same manner as that of Example 1 but the emulsion contained 10.8 grams of butadiene-1,3 and 4.6 grams of 2-chlorobutadiene 1,3. After polymerization under the same conditions, there was obtained 0.98 grams or 6.37% of a soft tacky product void of valuable physical properties.

It will be noted that very poor yields were obtained in the two examples just given. In the examples following, a modifying agent was present in each instance.

*Example 3*

An emulsion was made up of 20 cc. of sodium oleate containing 0.133 grams of sodium perborate. In this was placed 8.0 grams of butadiene-1,3, 4.0 grams of 2-chlorobutadiene-1,3 and, as modifier, 4.0 grams of vinylidene chloride. The dispersion was agitated for 90 hours at 50° C. when it appeared to have completely polymerized. The product was isolated by treatment with alcohol, filtering and drying under reduced pressure. The product, 12 grams, represented a 75% yield. The polymer was gray and rubber-like.

*Example 4*

In the emulsion of Example 3 was placed 4 grams of butadiene-1,3 and 8 grams of 2-chloro butadiene-1,3 together with 4 grams of vinylidene-chloride. Polymerization was conducted under the same conditions as in Example 3 and there was obtained 14.0 grams or 87.5% of a rubber-like mass of fine quality.

*Example 5*

The conditions here were the same as in the preceding two examples but the quantities of the monomers used were 20 grams of butadiene-1,3, 12 grams of 2-chlorobutadiene-1,3 and 2 grams of vinylidene-chloride as modifier. The polymerization gave 13.9 grams or 86.8% of a brown rubber-like mass.

In further experiments conducted with methyl methacrylate and with allyl methacrylate as a modifier of a butadiene-1,3+2-chloro butadiene-1,3 copolymerization, good yields of rubber-like polymers were also obtained. The results secured are tabulated as follows:

| Weight butadiene-1,3 | Weight chlorobutadiene-1,3 | Weight methyl methacrylate | Yield Weight | Yield Per cent |
|---|---|---|---|---|
| *Grams* | *Grams* | *Grams* | *Grams* | |
| 12 | 4 | 0.8 | 10.7 | 63.7 |
| 12 | 4 | 1.6 | 11.8 | 67.4 |
| 4 | 12 | 0.8 | 14.5 | 86.3 |
| 4 | 12 | 1.6 | 15 | 85.5 |
| | | Weight allyl methacrylate | | |
| | | *Grams* | | |
| 12 | 4 | 0.8 | 11.21 | 66.8 |
| 12 | 4 | 1.6 | 11.76 | 66.8 |
| 4 | 12 | 0.0 | 12.82 | 80.1 |
| 4 | 12 | 1.6 | 14.52 | 83.0 |

Likewise, the copolymerization of 1,3-butadiene and 2,3 dichlor 1,3-butadiene was favorably modified by the addition of ethyl methacrylate. The monomers were mixed in the amounts indicated below and were polymerized in an emulsion containing 20 cc. of a 3% solution of Duponol (a technical sodium lauryl sulfate) buffered by a phosphate-citrate buffer to maintain a hydrogen ion concentration of about pH 7.2 to 7.6 in the resulting latex. The solution also contained sodium perborate and carbon tetrachloride or ethylene dichloride may also be present as a catalyst. The polymerizations were conducted for a period of 24 hours at a temperature of 38° C. In the table, the figures represent percentage by weight of the whole charge of monomeric constituents and the yields are given as a percentage of this charge, an average of two experiments.

| Butadiene-1,3 | Di-Cl-butadiene-1,3 | Ethyl methacrylate | Yield |
|---|---|---|---|
| *Per cent* | *Per cent* | *Per cent* | *Per cent* |
| 60 | 40 | None | 67.6 |
| 58.1 | 38.8 | 3.1 | 69.8 |
| 56.25 | 37.5 | 6.25 | 63.3 |
| 52.5 | 35.0 | 12.5 | 78.2 |
| 48.75 | 32.5 | 18.75 | 78.2 |
| 45.0 | 30.0 | 25.0 | 84.3 |

The properties of the copolymers obtained were observed to improve as the amount of ethyl methacrylate was increased, the control, containing none of the ester, being rather dry and very feeble. The last two copolymers, however, were very similar to rubber in physical characteristics and had the appearance of smoked sheet rubber. The intermediate runs graded in properties between the control and the high ester products.

It will be apparent from the foregoing that there has been disclosed herein an improved method of securing copolymers in adequate yields so as to bring down the cost of producing synthetic rubber in this manner. The products obtained by the copolymerization of a halo butadiene, a hydrocarbon butadiene and a modifier of the class described are also a part of the invention. The conditions given herein can, of course, be varied in numerous particulars without departing from the scope of the invention and likewise other modifiers of the class described, in addition to those mentioned, may be used. While there have been described above the preferred embodiments of the invention, it will be apparent to those skilled in the art that various modifications and changes may be made therein without departing from the spirit of the invention or from the scope of the appended claims.

I claim:

1. A copolymer comprised of 4 parts by weight of 2,3-chlorobutadiene-1,3, from 1 to 16 parts of butadiene-1,3, and from 5 to 40% (based on the total content of the butadiene) of vinylidene chloride.

2. A copolymer comprised of 4 parts by weight of a conjugated butadiene having a chlorine substituent in at least one of the 2- and 3-positions, from 1 to 16 parts of a conjugated hydrocarbon butadiene, and from 5 to 40% (based on the total content of the butadienes) of vinylidene chloride.

ALBERT M. CLIFFORD.
WILLIAM D. WOLFE.

CERTIFICATE OF CORRECTION.

Patent No. 2,378,189. June 12, 1945.

ALBERT M. CLIFFORD, ET AL.

It is hereby certified that error appears in the printed specification of the above numbered patent requiring correction as follows: Page 1, first column, line 35, for "carboxy-aliphatic" read --COO-aliphatic--; page 2, second column, line 63, claim 1, for "butadiene" read --butadienes--; and that the said Letters Patent should be read with this correction therein that the same may conform to the record of the case in the Patent Office.

Signed and sealed this 6th day of November, A. D. 1945.

Leslie Frazer (Seal)             First Assistant Commissioner of Patents.